(No Model.)  3 Sheets—Sheet 3.
A. C. RALPH.
CAR BRAKE.
No. 558,208. Patented Apr. 14, 1896.
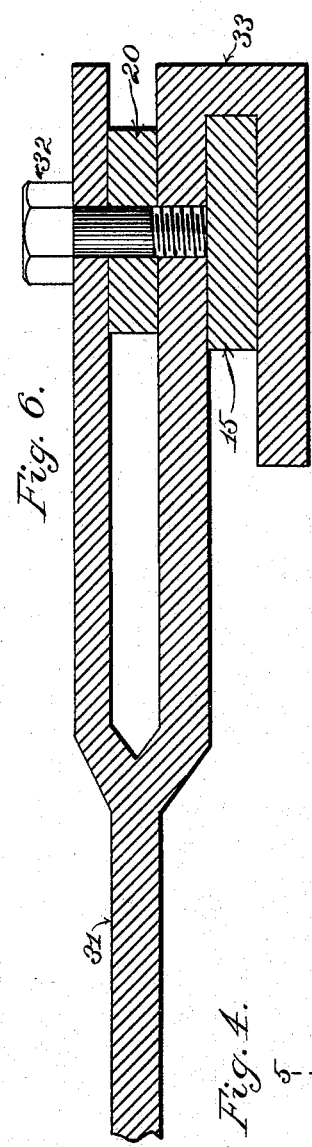
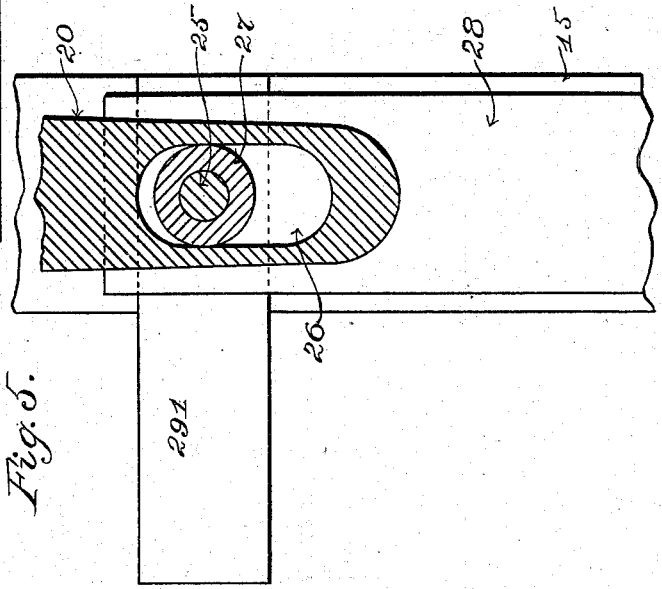
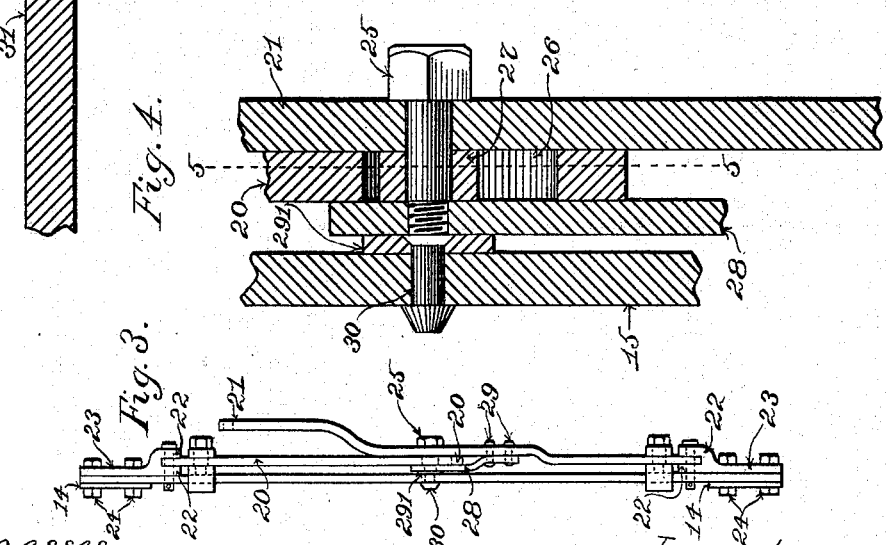
Witnesses
Oscar F. Gill
Robert Wallace
Inventor
Alson C. Ralph
by Macleod Calver & Randall
Attorneys

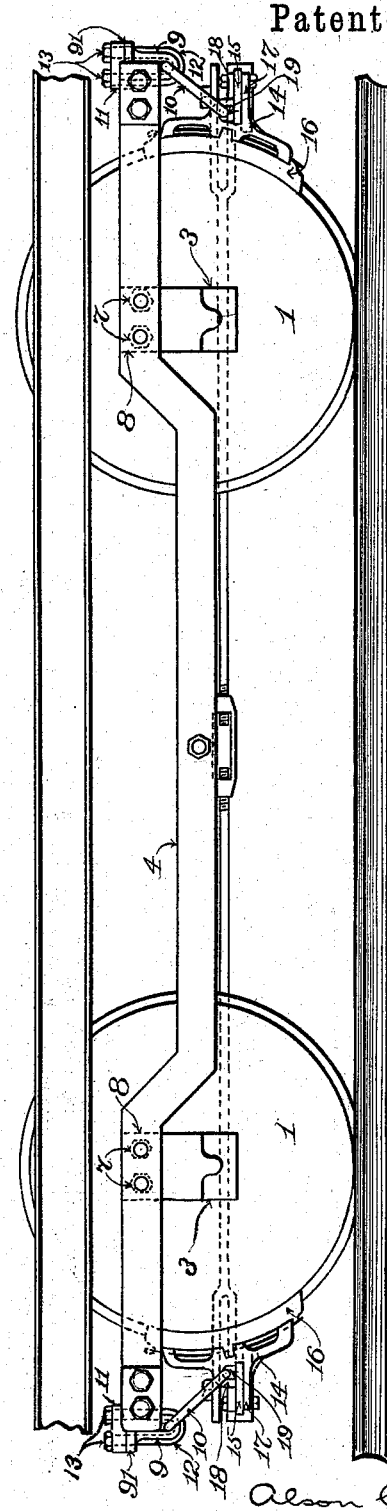

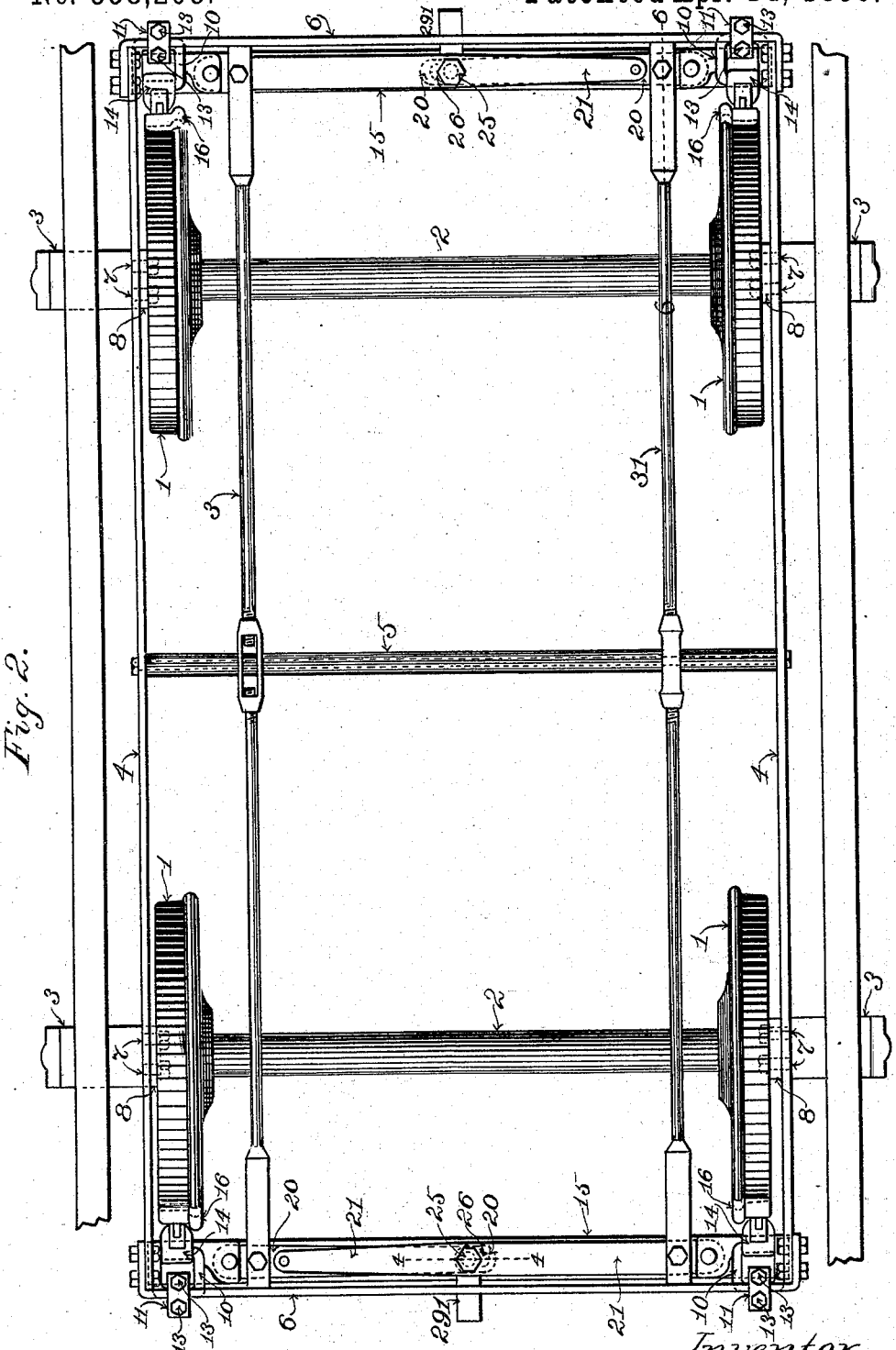

UNITED STATES PATENT OFFICE.

ALSON C. RALPH, OF SOMERVILLE, MASSACHUSETTS.

CAR-BRAKE.

SPECIFICATION forming part of Letters Patent No. 558,208, dated April 14, 1896.

Application filed December 9, 1895. Serial No. 571,484. (No model.)

*To all whom it may concern:*

Be it known that I, ALSON C. RALPH, a citizen of the United States, residing at Somerville, in the county of Middlesex and State of Massachusetts, have invented certain new and useful Improvements in Car-Brakes, of which the following is a specification, reference being had therein to the accompanying drawings.

The invention consists in certain novel and improved features of construction and arrangement and novel and useful combinations of parts, and first will be described fully with reference to the accompanying drawings, after which the characteristic features thereof will be more particularly pointed out and distinctly defined in the claims at the close of this specification.

More particularly the invention relates to car-brakes for application to four-wheel trucks, and I have shown it applied to such a truck in the drawings.

Figure 1 of the drawings shows in side elevation brake mechanism embodying my present invention and also sufficient of a car-truck to render clear the mode of applying and using the invention. Fig. 2 is a view showing in plan the parts and devices which are represented in Fig. 1. Fig. 3 is a view showing detached in side elevation one of the brake-beams and the brake-levers which are combined therewith. Fig. 4 is a view in section on the line 4 4 of Fig. 2. Fig. 5 is a view in section on the line 5 5 of Fig. 4. Fig. 6 is a view in section on the line 6 6 of Fig. 2.

1 1 are the wheels of the truck. 2 2 are the axles on which said wheels are fixed.

3 3 are the journal-boxes.

4 4 are side bars extending longitudinally of the truck, and 5 is a rod extending across the truck at an intermediate point in its length and connecting the said side bars together.

6 6 are end bars connecting the ends of the side bars and serving to form therewith a rectangular framing. This framing serves, as is made to appear in the course of the following description, for the support of the braking mechanism. The side bars 4 4 rest on the tops of the journal-boxes 3 3 and are secured by bolts 7 7 to the upwardly-extending flanges or portions 8 8, with which the said journal-boxes are provided.

9 9 are U-shaped pieces, which are applied to the end bars 6 6 and serve to connect to the said end bars the upper ends of the links 10 10. The said upper ends rest in the bottoms of the openings of the said U-shaped pieces, and the legs of the latter pass upwardly on opposite sides of the respective end bars. To the open end of each U-shaped piece 9 is applied a cap-piece or cross-bar 11. The U-shaped piece is held securely to the end bar, to which it is applied by means of the U-shaped clip 12, which latter is applied to the exterior of the U-shaped piece 9, its legs passing through holes in the laterally-projecting lugs 91 91 on the said piece 9, and also through holes in the cap-piece or cross-piece 11, and receiving on the screw-threaded extremities thereof, above the said cap-piece or cross-piece, the nuts 13 13. The lower portions of the links 10 10 engage with the castings 14 14, the latter being mounted upon the brake-beams 15 15 and having connected therewith the brake-shoes 16 16, all as will be apparent from the drawings. The castings 14 14 are each formed with a horizontal projection 17, upon which the brake-beam 15 rests, and also with a projecting portion 18 to contact with the upper surface of the brake-beam, said portion being notched, as at 19, to receive the lower portion of the corresponding link 10.

By the foregoing construction the brake-beams and brake-shoes are supported from side bars resting directly upon and secured directly to the journal-boxes. The brake-shoes in consequence are not affected in position relatively to the wheels by the load that is placed upon the car-body. No matter how much load may be carried it has no effect in shifting the brake-shoes vertically with respect to the centers of the wheels. In other forms of brake mechanism the positions of the brake-shoes vary vertically with relation to the centers of the wheels in proportion as the load varies, which is disadvantageous, inasmuch as depression of the brake-shoes below their normal level by a heavy load requires a correspondingly-increased amount of brake-chain to be wound up in order to set the brakes.

20 21 are the brake-levers which are employed in connection with each brake-beam 15. The outer end of each of these levers is fitted between the upper and lower jaws or lugs 22 22, that are formed at the inner end of a casting 23, which latter rests upon the upper surface of the brake-beam and is held thereto by the bolts 24 24. The said bolts 24 24 serve also to secure the adjacent casting 14 to the under side of the brake-beam, as shown most clearly in Figs. 1 and 3. The brake-levers 20 and 21 overlap at their inner ends, one of such levers—namely, 21—lying vertically above the other and being considerably the longer. To the free end of the lever 21 is intended to be connected the brake-chain. (Not shown.)

25 is a bolt which passes through a hole in the lever 21 and also through a slot 26 in the lever 20, a roller 27 being fitted upon a stem of the said bolt within the said slot to reduce the friction against the sides of the slot in the working of the levers. The screw-threaded lower end of the bolt fits a screw-threaded hole in a bent strip 28, which latter is held by rivets 29 29 to the upper lever and projects beneath the inner end of the under lever. By this means not only are the two levers joined pivotally, but they are prevented from moving vertically with relation to each other, and the bolt 25 is supported on opposite sides of the under lever against strain tending to twist the same.

291 is a piece secured to the upper surface of the brake-beam 15 by the rivets 30 30 and projecting outwardly. It constitutes a support and guide for the brake-levers when they are drawn outwardly in the operation of applying the brakes.

The lever 20 at each end of the truck is joined to the lever 21 at the opposite end of the truck by means of a rod 31. Each end of each of the said rods is split or forked, as indicated most clearly in Fig. 6, and the corresponding brake-lever 20 or 21 is received between the two jaws of the fork. A bolt 32, passing through holes in the two jaws or members of the fork, and also in the brake-lever, serves to connect the parts together, the lower end of the threaded bolt, and also the hole in the lower member or jaw of the fork, being correspondingly screw-threaded. The lower member or jaw of the fork is formed with or has connected therewith a hook 33, which latter passes around the outer edge of the brake-beam and beneath the latter, as shown clearly in Figs. 1, 3, and 6. The object of this feature is to cause strain that is transmitted through the rods 31 from the brake-levers at one end of the truck to be applied directly to the brake-beam at the other end of the truck instead of causing the said strain to be transmitted from the said rods to the latter brake-beam through the brake-levers which are connected therewith, as usually is the case.

The object in bolting the side bars of the brake-supporting frame to the journal-boxes is to prevent the lifting of either end of such frame when the brakes are set. As will be obvious, the action of the wheels at the advancing end of the truck will be to depress the braking devices at the said end, while that of those at the other end is to raise the braking devices at such end.

I claim as my invention—

1. The combination with the brake-beams at the opposite ends of a truck, of the pair of levers 20, 21, pivotally mounted upon each brake-beam, and connected to each other, and the rods joining the levers on each side of the truck together, said rods having means to engage with the brake-beams, to actuate the same, and thereby relieve the levers from the strain which is transmitted through the rods, substantially as described.

2. The combination with the brake-beams at the opposite ends of a truck, of the pair of levers 20, 21, pivotally mounted upon each brake-beam, and connected to each other, and the rods joining the levers on each side of the truck together, said rods having means to engage with the brake-beams to actuate the same, and thereby relieve the levers from the strain which is transmitted through the rods, and means to maintain the rods in position to engage the brake-beams when they are drawn upon, substantially as described.

3. The combination with the brake-beams at the opposite ends of a truck, of the pair of levers 20, 21, pivotally mounted upon each brake-beam, and connected to each other, and the rods joining the levers on each side of the truck together, said rods having hooked ends which extend around and beneath the brake-beams, to thereby engage the brake-beams for the purpose of actuating the latter and relieving the brake-levers from the strain which is transmitted through the rods, and also preventing the said rods from being disengaged from the brake-beams, substantially as described.

4. The combination with the brake-beam, of the pair of actuating-levers 20, 21, pivotally mounted upon the said brake-beam, one of the said levers having a slot as described, and the other thereof having secured thereto the supplemental piece passing to the opposite side of the lever first mentioned, the bolt applied to the second lever and its supplemental piece, and the antifriction-roller carried by the said bolt and working in the slot of the lever first mentioned, substantially as described.

In testimony whereof I affix my signature in presence of two witnesses.

ALSON C. RALPH.

Witnesses:
CHAS. F. RANDALL,
WM. A. MACLEOD.